United States Patent [19]

Plantan

[11] 4,261,624
[45] Apr. 14, 1981

[54] BRAKE SYSTEM

[75] Inventor: Ronald S. Plantan, Wickliffe, Ohio

[73] Assignee: White Motor Corporation, Eastlake, Ohio

[21] Appl. No.: 37,537

[22] Filed: May 10, 1979

Related U.S. Application Data

[63] Continuation-in-part of Ser. No. 909,059, May 24, 1978, abandoned.

[51] Int. Cl.³ .............................................. B60T 15/36
[52] U.S. Cl. .......................................... 303/7; 303/40
[58] Field of Search ..................... 303/7, 22 R, 13, 40, 303/47

[56] References Cited

U.S. PATENT DOCUMENTS

| | | | |
|---|---|---|---|
| 3,190,700 | 6/1965 | Fites | 303/7 X |
| 3,806,207 | 4/1974 | Reinecke et al. | 303/22 R |
| 3,819,238 | 6/1974 | Cermak | 303/47 |
| 3,971,596 | 7/1976 | Grix | 303/47 X |

Primary Examiner—Duane A. Reger

Attorney, Agent, or Firm—Watts, Hoffmann, Fisher & Heinke Co.

[57] ABSTRACT

A braking system for the tractor unit of a tractor trailer vehicle in which the ratio of the pressure applied to the front brakes to the pressure applied to the rear brakes changes automatically when a trailer is connected to or disconnected from the tractor. The brake system includes two dual mode relay valves and feedback conduits which convey feedback pressures between the front and rear dual mode valves and between a trailer brake service conduit and the front valve. The brake system includes brake pressure proportioning apparatus which is operative to reduce brake pressures on the rear tractor brakes, during normal brake applications, when the tractor is operated bobtail but which can be overriden by a vehicle operator if conditions warrant. The pressure feedback and system hysterresis cooperate to produce balanced braking and the proper sequence of brake application under a variety of vehicle operating conditions.

28 Claims, 5 Drawing Figures

BRAKE SYSTEM

CROSS REFERENCE

The present application is a continuation-in-part of application, Ser. No. 909,059, filed May 24, 1978, now abandoned.

BACKGROUND OF THE INVENTION

This invention relates generally to brake systems for tractor-trailer type vehicles and in particular a tractor brake system in which the front-to-back braking ratio is automatically modified when the tractor is operating without a trailer.

Present day tractor-trailer brake systems are generally pneumatically operated. The wheel brakes are energized by actuators, one of which is mounted at or near each wheel. The flow of pressure to these actuators is controlled by an operator actuated treadle valve. In some systems, the output pressure of the treadle valve is conveyed directly to the actuators, whereas in other systems, the treadle valve merely generates a signal pressure which is conveyed to a relay valve which in turn controls or modulates the flow of a reservoir pressure to the brake actuators.

Optimum braking rates for the various wheel assemblies will be dependent on the operating mode of the vehicle. In a heavily loaded vehicle, the trailer brakes and rear tractor brakes should be responsible for a greater portion of the braking. This is necessary to effect controlled braking and to reduce the possibility of premature wheel lockup.

When the tractor is operated without a trailer or, using industry parlance, when the tractor is operated "bobtail", the premature wheel lockup of the rear tractor wheels is of concern. The lockup of the rear tractor wheels can result in wheel hop and even lateral skidding of the vehicle.

Wheel hop generally increases the braking distance of the tractor. The loss of adhesion between vehicle tire and road surface is the most obvious cause of the extended braking distance. It has been reported that in some instances, the operator's reflex action to the wheel hop, is the removal or reduction of brake pedal foot pressure. This operator action, substantially increases the braking distance for it reduces the braking contribution of the front wheels as well as the hopping rear wheels.

One proposed method of solving this problem is the incorporation of anti-skid devices on the various wheel assemblies. These anti-skid devices generally include electronics which monitor wheel speed prior to and during braking and reduce pressure to the brake actuators should wheel lockup be imminent. At least a portion of the electronics used in these systems is generally mounted in or near the wheel assemblies. It should be readily appaent that as a result of their mounting location they are exposed to adverse environments including temperature extremes, rain, snow, road salt, and solvents used to clean vehicles for service. Additionally, they are exposed to vibration when the vehicles are in use. These factors result in frequent servicing being required not only in the electronics, but also in the interconnections and wiring among the various components.

Anti-skid devices, like anything which is electronic or mechanical, can fail. Failure of an anti-skid system may not be manifested until the vehicle operator encounters a severe braking situation. The failure during severe braking may result in unexpected wheel lockup and therefore an undesirable situation.

Because these systems generally involve sophisticated electronics to process and interpret the signals being generated by the sensors, they can significantly increase the initial cost of the vehicle. Repair of these devices is not only expensive, but should only be done by properly trained technicians. It may be difficult to obtain a system repair when on the road and down time for the repair can be excessive.

In summation electronic anti-skid devices are disliked by many vehicle operators because, in the view of these operators, these devices detract significantly from the profitability of a trucking operation. It is not just the original cost and the cost of service, but more importantly, the substantial loss of operating revenues due to the vehicle down time over the life of the vehicle.

In addition to anti-skid systems, systems have been suggested which allow the operator to manually adjust or select braking ratios of the various wheels. In general, these systems involve a variable restriction placed in appropriate pressure conduits or adjustable biasing of control valves. The operator is then provided with an adjustment, in some cases poppet-type valves, to control the amount of restriction or biasing. It should be readily apparent that the changes in braking ratios is not accomplished automatically but requires action by the vehicle operator.

Operator adjustable braking ratios are now precluded for many vehicles by Federal statute or regulations. These regulations mandate that a vehicle be able to stop within specified distances in a controlled manner and do so without operator intervention to adjust for vehicle operating conditions.

Other systems have been suggested which employ ratio valves to modify the flow of pressure to the front or rear brake actuators under various vehicle operating conditions. Such a system would provide a means for controlling the operation of the ratio valve so that its effect on brake pressure flow could be changed in response to vehicle operating modes. A problem associated with a brake system employing this type of ratio control, is that the ratio valve will be operated to reduce the flow to one or more brake actuators in all braking applications. These systems would reduce the flow of pressure to the associated brake actuators even if conditions warranted maximum brake application. Full treadle depression would not cause full system source pressure to be applied to the brake actuators. The pressure applied would in fact be source pressure reduced by the ratio valve. Thus, full braking would not be available on all vehicle wheels.

Several prior art proposals have also been suggested which do not modify braking ratios but only modify the "feel" of the braking system when operating without a trailer. This brake feel is in actuality the sensitivity of the operator controlled treadle valve. The problem addressed by this proposal is the over-braking that may occur when the tractor is operated without a trailer. This over-braking is caused by the excessive depression of the treadle valve of the operator who is conditioned to braking the tractor-trailer combination. Less depression of the treadle valve is necessary to stop the tractor alone than is needed to stop the tractor-trailer combination. An operator accustomed to the effort necessary to brake a tractor-trailer vehicle combination may find himself over-braking the tractor when operating without a trailer.

The proposed system discloses a method by which pressure going to the trailer is monitored. This pressure is used to control a reaction piston which acts against the operator foot force being applied to the treadle valve. The absence of a trailer, results in atmospheric pressure being present in the conduit conveying fluid pressure to the trailer. This proposed system utilizes this absence of fluid pressure to effect a maximum reaction force against the operator applied force. The resulting increased effort necessary to depress the brake treadle valve, is intended to reduce the tendency of the operator to over-depress the brake treadle valve.

Vehicle control and brake system performance during braking is also related to the sequence of brake application. In light brake applications, the minimum pressure or "crack-open pressure", required to initially open brake system control valves will usually dictate the order of brake application. In ordinary brake system control valves, valve hysteresis plays an important role in determining the crack-open pressure for the particular valve. If the brake system design does not properly account for differences in valve crack-open pressures, unbalanced braking may result especially in light brake applications. If substantial differences exist in crack-open pressures, it is possible that under certain braking situations, (usually very light brake applications) some of the brakes may not engage at all.

SUMMARY OF THE INVENTION

The present invention provides a solution to the described braking problem and without the need of electronic controls. Under normal braking conditions, it operates automatically, to proportionately reduce the pneumatic pressure going to the rear tractor brakes when operating without a trailer. The system is pneumatically controlled and relatively unaffected by vehicle vibration and road hazards and is generally impervious to the adverse environments in which th vehicles operate. It requires a minimum of maintenance and does not complicate service on the brake assemblies themselves.

In its preferred embodiment, the system includes a novel "dual mode" relay valve, the output of which, is dependent on both a treadle generated signal pressure and the output pressure of other brake system components. Essentially it utilizes pressure feedback from these components to derive an appropriate delivery pressure output.

In standard relay valves, a signal pressure is admitted into a signal chamber which acts on a control piston which in turn, controls the flow of pressurized fluid from a reservoir to the brake actuator. In the present invention, the relay valve is provided with an additional chamber which is adapted to receive fluid pressure from other brake system conduits. The pressure received in this "proportioning pressure" chamber acts on an area of the control piston in opposition to the force being applied by the signal pressure. The net effect of these two forces is a reduced delivery pressure output of the valve, whenever pressure is applied to the proportioning pressure chamber.

Two of these novel dual mode relay valves are used in the tractor brake system, one to control the flow of pressurized fluid to the front brake actuators and one to control the flow to the rear brake actuators. The tractor brake system further includes a conduit by which fluid pressure is conveyed to the trailer carried service brake system. Pressure is supplied to this conduit through a tractor protection valve, known in the art, whenever a trailer is attached.

The proportioning pressure chamber of the front dual mode relay valve communicates with the conduit supplying fluid pressure to the trailer service brake system. The proportioning chamber of the rear dual mode relay valve communicates with the delivery or output pressure of the front valve.

When the vehicle is operated with a trailer, the trailer service conduit pressurizes during braking in proportion to the extent of treadle depression. This trailer service pressure, communicated to the proportioning chamber of the front dual mode relay valve, will then proportionately reduce the output of the front valve. The output of the rear dual mode valve will also be reduced by the output pressure of the front valve, communicated to the proportioning chamber in the rear valve. Thus, when the tractor is operated with a trailer, the output pressures of the front and rear dual mode relay valves are substantially equal.

When operating bobtail, the conduit supplying pressure to the trailer service brake system will be disconnected and therefore at atmospheric pressure. The proportioning chamber of the front dual mode relay valve will not pressurize during braking and the output pressure will not be proportionately reduced. The proportioning chamber of the rear valve, communicating with the output of the front valve, will pressurize and the output of the rear valve will be proportionately reduced. The net result of this modified pressure feedback is reduced rear tractor braking under normal brake applications.

A significant feature of the present invention is the ability of the operator to override the proportioning system and apply full braking pressures to the front and rear actuators regardless of the vehicle operating mode. Specifically, the vehicle operator can "push through" the proportioning system by substantial depression of the treadle valve and effect full non-proportioned braking on all tractor wheels, regardless of vehicle operating mode.

This feature is accomplished in a straight forward and uncomplicated manner so that brake system reliability is not adversely affected. In the preferred embodiment, the dual mode relay valves operate as amplifying valves in the absence of pressure in the proportioning chamber. Thus, a signal pressure less than source pressure can effect a valve output equal to source pressure. The signal pressure that will produce source pressure at the output of the dual mode relay valve is determined by the amplifying ratio.

In the preferred embodiment, the dual mode relay valves are configured so that when a pressure equal to the applied signal pressure is communicated to the proportioning chamber, the output pressure of the dual mode relay valve will be substantially equal to the signal pressure. Under these pressure conditions, it operates as a one to one relay valve.

Under both vehicle operating conditions the output pressure of the front relay valve will act on the opposing area of the control piston in the rear relay valve to effect a reduced delivery output of the relay valve. When the tractor is operated with a trailer, the output of the front relay valve will be similarly reduced by the trailer service brake pressure. When the tractor is operated bobtail, the output of the front relay valve is not reduced. The attendant increased feedback pressure, which is conveyed to the rear relay valve, results in a proportionate decrease in the output of the rear valve for a given treadle valve depression.

In the preferred embodiment, the dual mode relay valve includes seals and control piston return springs which cause the hysteresis in the dual mode relay valves to be larger than conventional relay valves. Consequently, a larger crack-open pressure is necessary to initially open the dual mode valve. This feature insures that the trailer brakes engage before the tractor brakes due to the lower crack-open pressure of the trailer relay valves. This feature is desirable for it minimizes risk of jackknifing and enhances vehicle control.

When operating with a trailer, the valve hysteresis and pressure feedback also advantageously cooperate substantially to insure that the rear tractor brakes engage before the front tractor brakes. As described above, in this vehicle operating mode, the proportioning chamber of the front dual mode valve receives pressure from the trailer service conduit and does so immediately upon treadle depression. The proportioning chamber of the rear valve, however, must wait for a pressure output to be established at the front valve before its proportioning chamber becomes pressurized. Consequently, the pressure feedback to the rear valve will be delayed slightly, causing the rear valve to act as an amplifying relay valve and produce an amplified output for a signal pressure too small to effect opening of the front dual mode relay valve. The application of the rear tractor brakes will thus occur slightly before the front tractor brakes and provide better vehicle control especially under light brake applications.

The performance characteristics of the brake system of the present invention, enhance overall vehicle control during braking without the need of electronic controls. The valve hysteresis and pressure feedback between the dual mode relay valves in the tractor produce balanced braking and more importantly produce a desirable sequence of brake application. When operating with a trailer, the application of the rear tractor brakes is delayed slightly due to the larger crack-open pressure of the rear dual mode relay valve as compared to the trailer relay valve. Once the rear dual mode relay valve opens, however, its output quickly rises to an output determined by the signal pressure applied and its effective amplifying ratio. Thus, the rear tractor brakes quickly blend into the braking sequence to share in the braking load. The application of the front brakes is also delayed slightly by valve hysteresis and pressure feedback, so that maximum steering potential is always available especially under light braking.

When operating bobtail, the proportioning system is operative to maintain an output pressure of the rear dual mode relay valve which is below that which would produce wheel lockup in the rear tractor wheels. This feature significantly enhances overall vehicle control when operating without a trailer.

It should now be apparent, that a novel braking system is presented which automatically adjusts the front-to-rear braking ratio on the tractor unit. This system does not rely on sophisticated and expensive electronic controls and is therefore not plagued by the failures and service costs of prior systems. Because it is pneumatic in nature, it is as reliable as the rest of the pneumatic brake system. It does not require operator intervention for activation for it responds immediately upon the disconnection of the trailer unit.

It is the general object of this invention to provide a brake proportioning system for a tractor unit of a tractor-trailer vehicle.

It is a further object of this invention to provide a brake proportioning system which is activated automatically, requires no operator intervention and is relatively maintenance free.

It is another object of this invention to provide a brake proportioning system which does not complicate excessively the overall tractor brake system.

It is another object of this invention to provide a brake system control valve responsive to both an operator controlled signal pressure and the output pressure of other system components.

It is a further object of this invention to provide a brake proportioning system which can be overridden by the operator regardless of the vehicle operating mode.

Further objects of this invention and a fuller understanding will become obvious in reading the following system description.

DESCRIPTION OF THE PREFERRED EMBODIMENT

Figure 1:
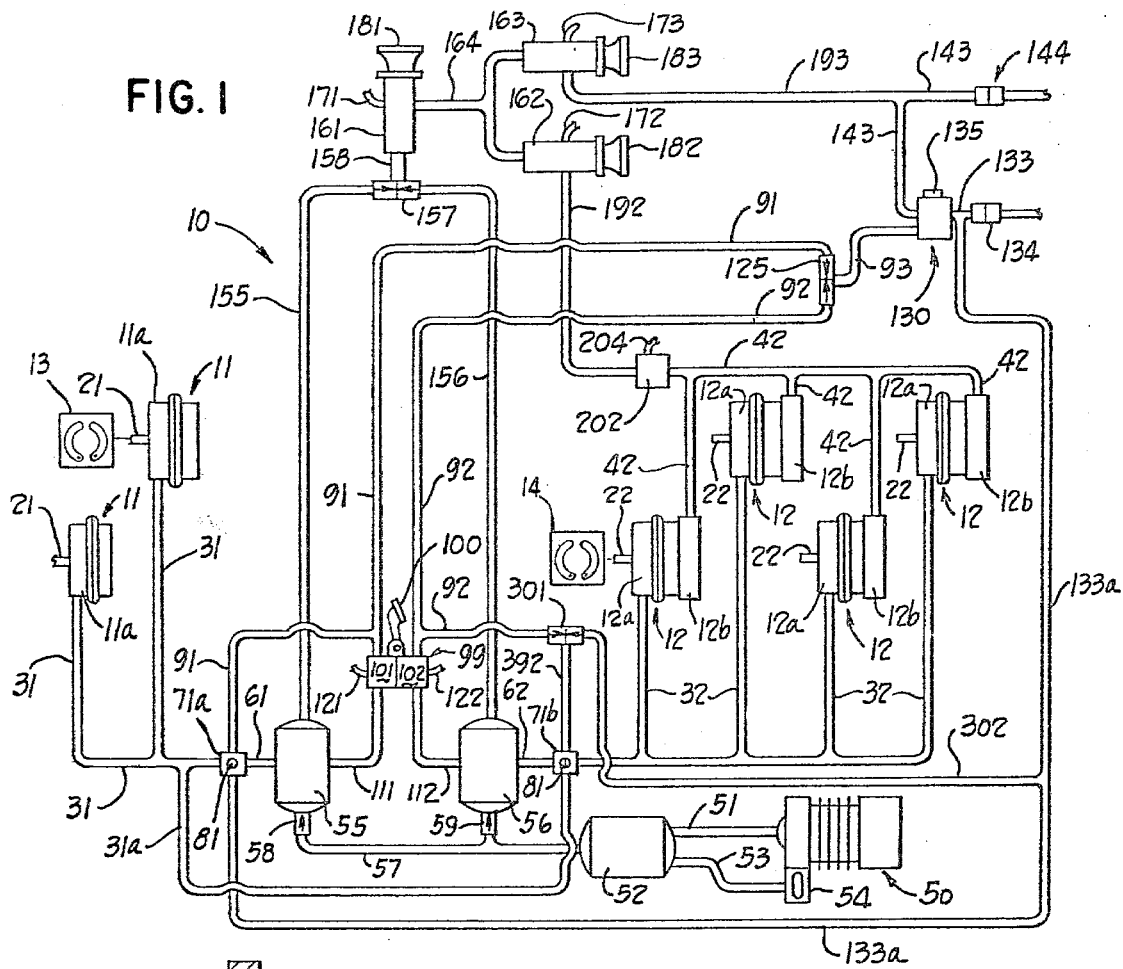
FIG. 1 is a schematic view of a tractor brake system embodying the present invention.

Referring to FIG. 1, a tractor brake system is shown generally at 10. The brake system 10 includes two tractor front wheel brake actuators 11 and four tractor rear wheel brake actuators 12 for operating conventional front and rear friction brakes 13, 14 (shown schematically in FIG. 5).

The front wheel brake actuators 11 are conventional pneumatic brake actuators having service chambers 11a and having extensible push rods 21. A conduit 31 communicates with the service brake chambers 11a. When pressurized air is supplied by the conduit 31 to the service brakes chambers 11a, the push rods 21 extend to effect braking of the tractor front wheels (not shown). When air is exhausted from the conduit 31, the push rods 21 retract to release the brake actuators 11.

The rear wheel brake actuators 12 are conventional pneumatic brake actuators having tandem service and spring brake chambers 12a, and 12b. The brake actuators 12 have extensible push rods 22. Service brake conduits 32 communicate with service brake chambers 12a. Spring brake conduits 42 communicate with spring brake chambers 12b.

During normal vehicle operation, pressurized air is supplied through the conduits 42 to the spring brake chambers 12b to effect spring brake release. When air is exhausted from the spring brake chambers 12b the spring brake actuators are operative to effect extension of the push rods 22 to brake the rear tractor wheels (not shown).

During normal vehicle operation, the service brake chambers 12a are operative when pressurized by air supplied from the conduit 32 to extend the push rods 22 and apply the brake actuators 12. When air is exhausted from the service chambers 12a the push rods 22 retract.

Pressurized air is supplied to the brake system 10 by a compressor 50. A supply conduit 51 receives pressurized air from the compressor 50. A primary reservoir 52 receives pressurized air from the supply conduit 51. A return conduit 53 communicates with the reservoir 52. A governor 54 communicates with the conduit 53 and with the air compressor 50. When the pressure in the primary reservoir 52 reaches a predetermined magnitude, the governor 54 permits pressurized air to circulate through the conduits 51, 53 between the reservoir 52 and the governor 54 to prevent a further increase in pressure in the reservoir 52.

Two secondary reservoirs 55, 56 are supplied with pressurized air from the primary reservoir 52. A pair of check valves 58, 59 communicate with the conduit 57 and the reservoirs 55, 56. The check valves 58, 59 permit the flow of pressurized air into the reservoirs 55, 56 from the conduit 57 and prohibit reverse flow.

The flow of pressurized air from reservoir 55 to the front brake actuators 11 is controlled through a dual mode relay valve 71a of this invention. The flow of pressurized fluid from reservoir 59 to the rear brake actuators is controlled by a like dual mode relay valve 71b. The operation and construction of these valves will be described later in greater detail.

Treadle valve 99 includes a foot operated lever 100 which concurrently operates a pair of valves 101, 102. The valve 101 controls the flow of pressurized fluid from reservoir 55 to signal conduit 91. The valve 102 provides a similar function between reservoir 56 and signal conduit 92. When the foot pedal 100 is depressed by an operator, pressurized air is supplied from conduits 111, 112 to the signal conduits 91, 92 by the valves 101, 102 respectively in proportion to the extent of foot pedal depression. When the foot operated pedal 100 is in its normal non-depressed position, the valves 101, 102 communicate the signal conduits 91, 92 with the vents 121, 122, exhausting the signal conduits 91, 92 to atmosphere.

The treadle valve 99 is preferably a dual system treadle valve. Specifically, the pedal 100 mechanically operates the valve 102, directly applying force to a spring biased valve element (not shown), which controls the flow of pressurized air between the conduits 112, 92. The valve 101 is generally disposed below the valve 102 and is pilot pressure operated. Specifically, a portion of the output pressure of the valve 102 is fed through a pilot passage to valve 101. The pressure communicated to valve 101 applies a force to an internal valve element (not shown) to effect opening and allow pressurized air to flow from the conduits 111 to the conduit 91. Because the opening of the valve 101 is dependent on the output pressure of 102, a slight pressure difference between the valves 101, 102 can normally be expected. This type of treadle valve usually includes a fail safe feature in the event that valve 102 malfunctions. Even though valve 101 normally depends on an output pressure in valve 102, to effect opening, the pedal 100 will mechanically operate valve 101 if an output pressure is not established by the valve 102 after a predetermined pedal travel.

The signal conduits 91, 92 each have branches which communicate through a double check valve 125 with a signal conduit 93. The check valve 125 is operative to permit the flow of pressurized air from the signal conduits 91, 92 to the signal conduit 93 and to prevent reverse flow. In the event that the air pressure in conduits 91, 92 is unequal, the check valve 125 will communicate only the higher pressurized one of the conduits 91, 92 with the signal conduit 93.

A tractor protection valve 130 communicates with the signal conduit 93, a supply conduit 143 and an output conduit 133. When the air pressure in the signal conduit 93 is below a predetermined level, the valve 130 communicates the conduit 133 with vent port 135, venting the conduit 133 to atmosphere. When air pressure in the signal conduit 93 exceeds a predetermined level, the valve 130 conveys pressurized air from the conduit 143 to the conduit 133 in proportion to the pressure in the signal conduit 93.

A pair of quick-disconnect pneumatic connectors 134, 144 are provided to releasably connect the tractor carried brake system to a trailer carried brake system when a trailer is being towed by the tractor. These quick-disconnects are constructed such that the conduits 133, 143 communicate with the atmosphere when not coupled to associated trailer brake system conduits.

A pair of supply conduits 155, 156 communicate respectively with the reservoirs 55, 56. A conventional double check valve 157 communicates with the supply conduits 155, 156 and with a supply conduit 158. The check valve 157 is operative to permit the flow of pressurized air from the supply conduits 155, 156 to the supply conduit 158 and to prevent reverse flow. In the event that the air pressure in one of the conduits 155, 156 is higher than in the other of the conduits 155, 156, the check valve 157 will communicate only the higher pressurized one of the conduits 155, 156 with the supply conduit 158.

Three conventional push-pull control vavles 161, 162, 163 are carried in the tractor cab (not shown). A conduit 164 interconnects the valves 161, 162, 163. The valves 161, 162, 163 communicate with vents 171, 172, 173 and have push-pull knobs 181, 182, 183. A pair of conduits 192, 193 communicate respectively with the valves 162, 163.

The valve 161 is operative to selectively communicate the conduit 164 with the supply conduit 158 and with the vent 171. When the knob 181 is pushed to its inward position, the valve 161 communicates the conduits 158, 164. When the knob 181 is pulled to its outward or "popped" position, the valve 161 communicates the conduit 164 and vent 171, venting the conduit 164 to atmosphere.

The valve 162 is operative to selectively communicate the conduit 192 with the conduit 164 and with the vent 172. When the knob 182 is pushed to its inward position, the valve 162 communicates the conduits 192, 164. When the knob 182 is pulled to its outward or "popped" position, the valve 162 communicates the conduit 192 and vent 172, venting the conduit 192 to atmosphere.

The valve 163 is operative to selectively communicate the conduit 193 with the conduit 164 and with the vent 173. When the knob 183 is pushed to its inward position, the valve 163 communicates the conduits 193, 164. When the knob 183 is pulled to its outward or "popped" position, the valve 163 communicates the conduit 193 and vent 173, venting the conduit 193 to atmosphere.

A quick release valve 202 communicates with the conduits 192, 42, and with a vent 204. When the pressure in the conduit 192 exceeds a predetermined level, the quick release valve communicates the conduits 192, 42. When the pressure in the conduit 192 drops below a predetermined level, the quick release valve 202 communicates the conduit 42 and vent 204, venting the conduit 42 to atmosphere.

In operation, when the tractor engine (not shown) is started, the air compressor 50 begins charging the reservoirs 52, 55, 56. As soon as the reservoirs 55, 56 are pressurized, the foot-operated valve 99 is operative to control the front wheel service brake actuators 11. The rear wheel brake actuators 12 are not yet released inasmuch as the spring brake chambers 12b are still exhausted.

The spring brake chambers 12b are pressurized to release the rear wheel brake actuators 12 by pushing in the control knobs 181, 182 to communicate the conduits 158, 164, 192. As pressure rises in the conduit 192, the quick release valve 202 communicates the conduits 192, 42 to pressurize the spring brake chambers 12b. Once the spring brake chambers 12b are pressurized, the foot-operated valve 99 is operative to control the rear wheel brake actuators 12.

If a trailer carried brake system is attached to the tractor brake system via the quick-disconnects 134, 144, depression of the foot lever 100 to apply the tractor carried brake actuators 11, 12, will effect the concurrent application of the trailer carried brake actuators (not shown). When the treadle valve 99 is actuated by depression of the foot lever 100, pressure is supplied to the signal conduits 91, 92, and hence 93, in proportion to the amount of depression. The tractor protection valve 130 then operates to convey pressurized fluid from the conduit 143 to the conduit 133 in proportion to the pressure in the signal conduit 93. Pressurized fluid in the conduit 133 flows to a communicating trailer carried relay valve (not shown) which in turn supplies pressurized fluid to the trailer brake actuators (not shown), effecting trailer brake application.

The valve 162 provides an operator control for effecting spring brake application of the tractor rear wheel brake actuators 12. When the knob 182 of the valve 162 is pulled out to its "popped" position, the conduit 192 is vented to atmosphere. As pressure falls in the conduit 192, the quick release valve 202 vents the conduit 42 to atmosphere, exhausting the spring brake chambers 12b.

The valve 163 provides an operator control for exhausting air pressure from the conduits 193, 143. When the vehicle is operated with a trailer, the conduit 143 supplies air pressure to the emergency brake actuators (not shown) of the trailer. These actuators, generally operate in a manner similar to the spring brake actuators 12 on the tractor. When the knob 183 of the valve 163 is pulled out to its "popped" position, the conduit 193 is vented to atmosphere. The emergency brakes on the trailer are applied as the pressure depletes in the conduits 193, 143.

When the vehicle is operated with a trailer, conduits 143 and 193 convey reservoir pressure through the connector 144 to the corresponding emergency spring brake conduit on the trailer (not shown). A branch of the conduit 143 supplies the same pressure to the tractor protection valve 130. The tractor protection valve 130 is configured and designed to supply pressure to the conduit 133 in response to a signal pressure in the conduit 93 supplied by the treadle valve 99, as long as conduit 143 remains pressurized.

When operating without a trailer, the connectors 144, 134 and the associated conduits 133, 143 communicate with the atmosphere. The valve 163 generally "pops" to its outward position in order to interrupt the flow of pressurized fluid from the conduit 164 to the conduit 193. The absence of pressure in the conduit 193 and hence the conduit 143 causes the tractor protection valve 130 to close off communication between the conduits 93 and 133 and vents pressure existing in the conduit 133 to atmosphere through the vent port 135.

Figure 2:
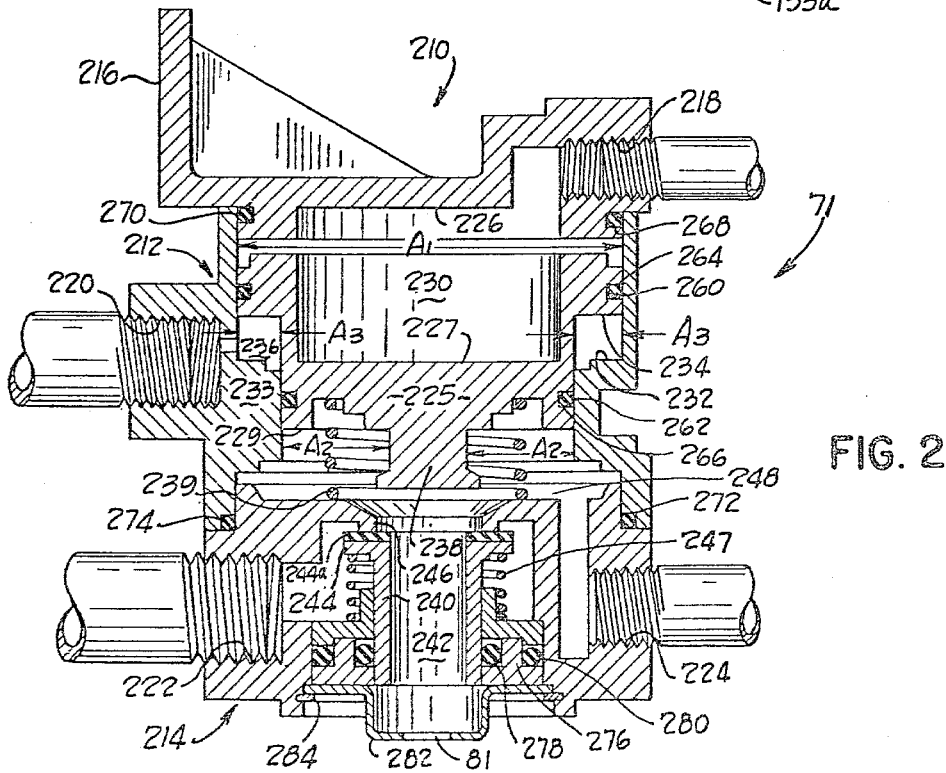
FIG. 2 is a cross-sectional view of the preferred embodiment of the dual mode relay valve used in the system of FIG. 1, the valve components being in the position they assume in the absence of input pressures.

The preferred embodiment of a dual mode relay valve 71 of this invention is shown in FIG. 2. One of these valves, 71a, controls the flow of pressurized fluid to the front brake actuators 11. Another one of these valves, 71b, controls the flow of pressurized fluid to the rear tractor brake actuators 12. Th valve 71a includes a vent port 81 for exhausting fluid pressure from the conduit 31 in the absence of pressure in the signal conduit 91. Valve 71b includes vent port 81 for exhausting pressurized fluid from the conduit 32 in the absence of pressure in the signal conduit 392.

The valve 71, includes three sub-assemblies in the forms of a cover 210, an upper housing 212 and a lower housing 214 which also acts as a bottom cover. The top cover 210 includes a mounting flange 216 and a threaded signal pressure input port 218. The upper housing 212 includes a threaded proportioning pressure input port 220. The lower housing 214 includes a threaded reservoir supply port 222 and a threaded delivery pressure port 224. The three valve sub-assemblies 210, 212, and 214 are secured together by means of threaded fasteners (not shown).

Disposed within the bore of the upper housing 212 is an annular control piston 225. Bottom surface 226 of the cover 210 and top surface 227 of the control piston 225 define a signal pressure chamber 230. Top surface 232 of an annular shoulder 233 formed in the upper housing and a lower surface 234 of the control piston 225 define a proportioning pressure chamber 236 communicating with the brake proportioning port 220. The control piston 225 further includes a downward extending portion 238. A relatively light spring 239, surrounds the downward portion 238 and urges the control piston 225 upward and assures that the piston 225 returns to its uppermost position when signal pressure is removed from the chamber 230.

Disposed within the lower housing and axially aligned with the control piston 225 is an inlet valve 240. Disposed within the inlet valve 240 is a bore 242 which acts as an exhaust passage and communicates with the atmosphere. An annular flange 244 is formed in the top of the inlet valve 240 and carries a seal 244a. The inlet valve 240 is biased into abutting, sealing engagement with annular housing portion 246 by an inlet valve return spring 247. The delivery port 224 communicates with a delivery pressure chamber 248. When the seal 244a of the inlet valve 240 abuts the annular housing portion 246, the flow of pressurized fluid from the reservoir port 222 into the chamber 248 is prevented.

Resilient seals 260, 262 are carried by annular grooves 264, 266, respectively in the control piston 225. These seals allow the control piston to slide axially within the bore but prevent fluid communication between the various pressure chambers. Specifically, the seal 260 prevents fluid communication between the signal pressure chamber 230 and the proportioning pressure chamber 236. The seal 262 prevents fluid communication between the proportioning pressure chamber 236 and the delivery pressure chamber 248.

An annular groove 268 in top cover 210 carries a resilient gasket 270 which seals the interface between the top cover 210 and the upper housing 212. Similarly, an annular groove 272 in the upper housing 212 carries a resilient gasket 274 and seals the interface between the upper housing 212 and the lower housing 214.

A valve seat insert shown generally as 276 carries two resilient seals 278 and 280. The seal 280 seals the interface between the insert 276 and the lower housing 214. The seal 278 allows the inlet valve 240 to slide axially within the seat insert 276 and concurrently seals the periphery of the inlet valve. A cap 282 having an aperture 81 is secured by snap ring 284 and retains the valve seat insert within the lower housing 214.

OPERATION OF THE DUAL MODE RELAY VALVE

In operation, signal pressure generated by the treadle valve 99 enters the chamber 230 through the signal port 218. The pressure in the chamber 230, acting on area $A_1$, of the surface 227 of the control piston 225, urges the piston downward. Prior to control piston movement, the delivery port 224 and delivery pressure chamber 248 communicate with the atmosphere through the exhaust passage 242 in the inlet valve 240. As the control piston 225 moves downwardly, the downward extending portion 238 contacts the seal 244a of the inlet valve 240 and seals the chamber 248 from the atmosphere. Further downward movement causes the inlet valve 240 to open allowing pressure from the reservoir port 222 to enter the delivery chamber 248 and exit through the delivery port 224.

The pressure in the delivery chamber 248 acts on the area $A_2$ of the lower control piston surface 229 in opposition to the force being applied by the pressure in the signal chamber 230 acting on area $A_1$. It must be remembered that the force applied to a given surface on the control piston 225 is the product of the area of the surface and the pressure to which it is exposed. Once the force being applied to the lower surface 229 of the control piston exceeds that being applied to the surface 227 of the control piston, the piston will move upward allowing the inlet valve 240 to close, interrupting the flow of reservoir pressure to the delivery port 224. It should be apparent that the amount of pressure that will be allowed to flow to the delivery port before control piston 225 is forced upward, will depend on the signal pressure introduced into the signal chamber 230. Absent pressure in the proportioning pressure chamber 236, the delivery port pressure for a given signal pressure will be the product of the signal pressure and the ratio of $A_1$ to $A_2$, or expressed mathematically: (excluding valve hysteresis)

Delivery Pressure = (Signal Pressure) × $A_1/A_2$

The operational explanation has thus far excluded the chamber 236. It should be apparent that pressure entering the port 220 and acting on area $A_3$ of the lower surface 234 of the control piston will tend to urge the control piston upward. It will thus be seen that by introducing pressure into the chamber 236, less pressure need enter the delivery chamber 248 to effect the upward movement of the control piston. Or conversely, more signal pressure must enter the chamber 230 to effect downward movement of the control piston to offset the pressure being applied to the area $A_3$ of the control piston.

To arrive at the relationship between delivery port pressure, proportioning pressure, and signal pressure, it must be remembered that the control piston 225 will interrupt pressure flow to the delivery port when the forces tending to urge the control piston downward equal those forces tending to urge the control piston upward. The delivery pressure and the proportioning pressure acting on the respective areas, $A_2$ and $A_3$, of the control piston 225 urge the piston upward, whereas the signal pressure acting on the area $A_1$, urges the piston downward. Accordingly:

Delivery Pressure × $A_2$ + Proportioning Pressure × $A_3$ = Signal Pressure × $A_1$ This equation can now be solved for delivery pressure; the following mathematical relationship results: (excluding valve hysteresis)

Delivery Pressure = (Signal Pressure) × $A_1/A_2$ − (Proportioning Pressure) × $A_3/A_2$ It should now be apparent that the delivery pressure of the valve 71 will be reduced whenever pressure is introduced into the proportioning pressure chamber 236. The reduction will be equal to the product of the proportioning pressure applied and the ratio of $A_3$ to $A_2$.

BRAKE SYSTEM OPERATION

Returning now to the individual dual mode relay valves 71a and 71b, the following conduit connections exist. The signal port 218 of the valve 71a communicates with the signal conduit 91. The reservoir supply port 222 of the valve 71a communicates with the supply conduit 61. The delivery port 224 communicates with the actuator supply conduit 31. The proportioning pressure input port 220 of the valve 71a communicates with pressure feedback conduit 133a. The vent port 81 of the valve 71a is the aperture in the cap 282.

The dual mode relay valve 71b controls the flow of fluid pressure to the rear tractor brake actuators 12. The reservoir supply port 222 of the valve 71b communicates with the supply conduit 62. The delivery port 224 of the valve 71b communicates with the actuator supply conduit 32. The proportioning pressure input port 220 of the valve 71b communicates with the feedback conduit 31a. Vent port 81 of the valve 71b is the aperture in the associated cap 282. Signal pressure under the control of the treadle valve 99 is communicated to the signal port 218 of the valve 71b by a signal conduit 392. The conduit 392 receives the signal pressure through a conventional double check valve 301 which communicates with the conduit 92 and a branch feedback conduit 302. The doublecheck valve 301 is operative to communicate the higher pressurized one of the conduits 92, 302. The conduit 302 and doublecheck valve 301 form a fail safe feature to prevent the output pressure of the dual mode relay valve 71b from being over reduced by the pressure communicated to the proportioning chamber through the pressure feedback conduit 31a. This pressure over reduction would occur if the pressure in the reservoir 56 fell substantially below the pressure in the reservoir 55. Should this occur, the check valve 301 would operate to communicate the signal pressure from the conduit 302 to the signal conduit 392.

The operation of the brake proportioning system can be best explained by reference to both FIGS. 1 and 2. When the tractor is operated without a trailer, the following brake system mode of operation occurs. Because of the absence of the trailer, the connectors 144 and 134 are separated and hence the conduit 143 and the conduit 133 are at atmospheric pressure. Depressing the pedal 100 causes the treadle valve 99 to generate signal pressures, in an amount proportional to the amount of depression. Signal pressures flow into the signal conduits 91, 92. These signal pressures, introduced into the respective signal pressure chambers 230 of the valves 71a, 71b, tend to urge the control piston 225 in each of these valves downward until the control piston portions 238 are in abutting engagement with the inlet valve seal 244a of each of the inlet valves 240. Additional signal pressure entering the signal pressure chambers 230 will cause further downward movement of the piston 225 and thereby cause the inlet valve 240 to open in each valve 71a, 71b.

Fluid pressure will now flow, by way of the dual mode relay 71a, from the conduit 61 into the reservoir port 222, (of valve 71a) into the delivery chamber 248 and out through the delivery port 224 into the conduit 31. The branch conduit 31a will also receive this fluid pressure and will direct it to the proportioning pressure port 220 of the valve 71b. This fluid pressure will enter the chamber 236 of the valve 71b and act on the lower area $A_3$ of the control piston 225. This pressure will tend to urge the control piston upward and reduce the delivery pressure of the dual mode relay valve 71b in proportion to the delivery port pressure of the dual mode relay valve 71a.

The conduit 133a, being in fluid communication with the conduit 133 is at atmospheric pressure. The conduit 133a communicates with the proportioning pressure port 220 of the valve 71a. Because this conduit is at atmospheric pressure, no force is applied to area $A_3$ of the control piston 225 of the valve 71a. The lack of proportioning pressure in chamber 236 of the front relay 71a causes an output pressure differential to exist between the valves 71a and 71b. Specifically, for a given signal pressure, generated by the treadle valve 99, the delivery pressure for the valve 71a will be greater than that for the valve 71b. Essentially, the output pressure of the rear relay valve 71b will be offset or reduced by the output pressure of the front relay valve 71a. Because the chamber 236 of the relay valve 71a is at atmospheric pressure by virtue of conduit 133a, signal pressure entering its port 218 will effect maximum movement of the control piston 225 and hence maximum delivery pressure output for a given signal pressure. It is important to note that once the delivery pressure of the valve 71a equals the reservoir pressure (of reservoir 55), the output of the rear valve 71b will continue increasing with increased signal pressure, gradually reducing the differential between the output pressures in the valves 71a, 71b.

When the tractor is operated with a trailer, the communicating conduits 193, 143 are at reservoir pressure by virtue of the depressed position of the valve 163. The conduit 133 will receive fluid pressure through the tractor protection valve 130 in proportion to the signal pressure in the signal conduit 93. The pressure in the conduit 93, as explained above, is the greater of the pressures in the signal conduits 91, 92. Under normal operating conditions the conduits 91 and 92 have substantially equal signal pressures for a given treadle valve (99) depression. Thus, when the treadle valve 99 is depressed, pressure will flow from the conduit 111 to both branches of the signal conduit 91 in proportion to the amount of depression of the pedal 100. Similarly, pressure will flow from the conduit 112 to both branches of the signal conduit 92 in proportion to the depression of the foot pedal 100. These signal pressures will be communicated to the conduit 93 through the check valve 125.

The operation of the relay valve 71b is the same whether the tractor is operated with or without a trailer. The operation of the relay valve 71a however changes. When the tractor is operated without a trailer, the conduit 133a which communicates with the proportioning pressure port 220 of the relay valve 71a is at atmospheric pressure. When operating with a trailer, the tractor protection valve 130 becomes operative; the conduit 133a will be at a pressure proportional to the signal pressure in the conduit 93. The pressure in conduit 133a will be conveyed through the proportioning pressure port 220 of the relay valve 71a to its proportioning pressure chamber 236. This pressure will act on area $A_3$ of control piston surface 234 and urge the control piston upward. Thus for a given signal pressure generated by the treadle valve 99, the relay valves 71a and 71b will receive proportioning pressures through the feedback conduits 133a and 31a respectively. This offsetting pressure will be more or less equal for both of the relay valves and hence the output of each will be reduced a similar amount. As a result, the delivery pressure output of both of the dual mode relay valves 71a, 71b will be essentially equal.

An important feature of the preferred embodiment of the present invention is the ability of the operator to "push-through" the brake proportioning system and apply full reservoir pressure to the brake actuators, regardless of the vehicle operating mode. Specifically, the vehicle operator can "push-through" the proportioning system by substantial depression of the treadle valve 99 and affect full non-proportioned braking on all tractor wheels. The preferred embodiment of the dual mode relay valve 71, as depicted in FIG. 2, operates as an amplifying relay valve in the absence of pressure in the proportioning chamber 236. The amplifying ratio is determined by the ratio of the areas $A_1$ to $A_2$. Thus, the output pressure of the dual mode relay valve 71 will be proportionately higher than the applied signal pressure, the output pressure being a function of the amplifying ratio and the signal pressure. Thus, a signal pressure less than source pressure, applied to the amplifying dual mode relay valve 71, can effect a valve output equal to source pressure. The signal pressure that will produce this output is determined by the amplifying ratio.

Figure 4:
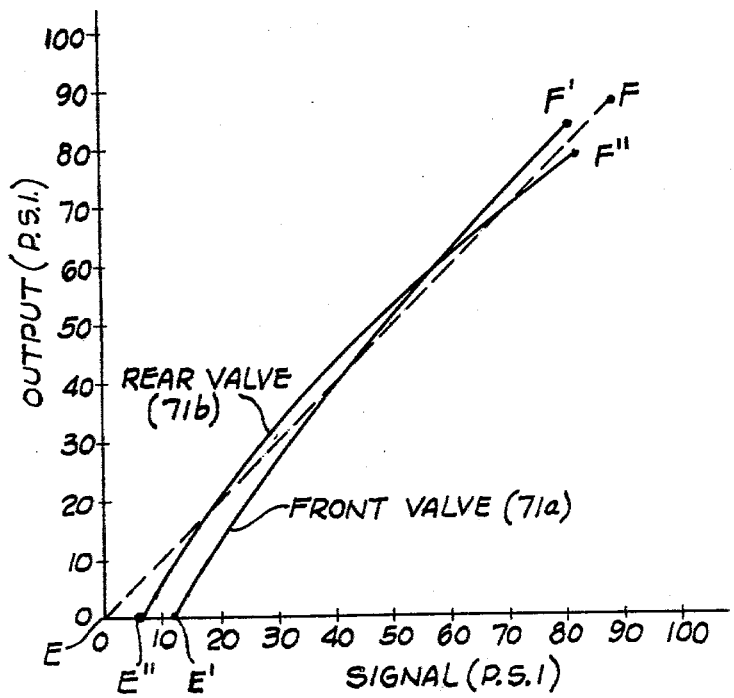
FIG. 4 graphically illustrates the relationship between signal pressure and output pressure for the front and rear dual mode relay valve in FIG. 2, when the vehicle is operated with a trailer.
Figure 3:
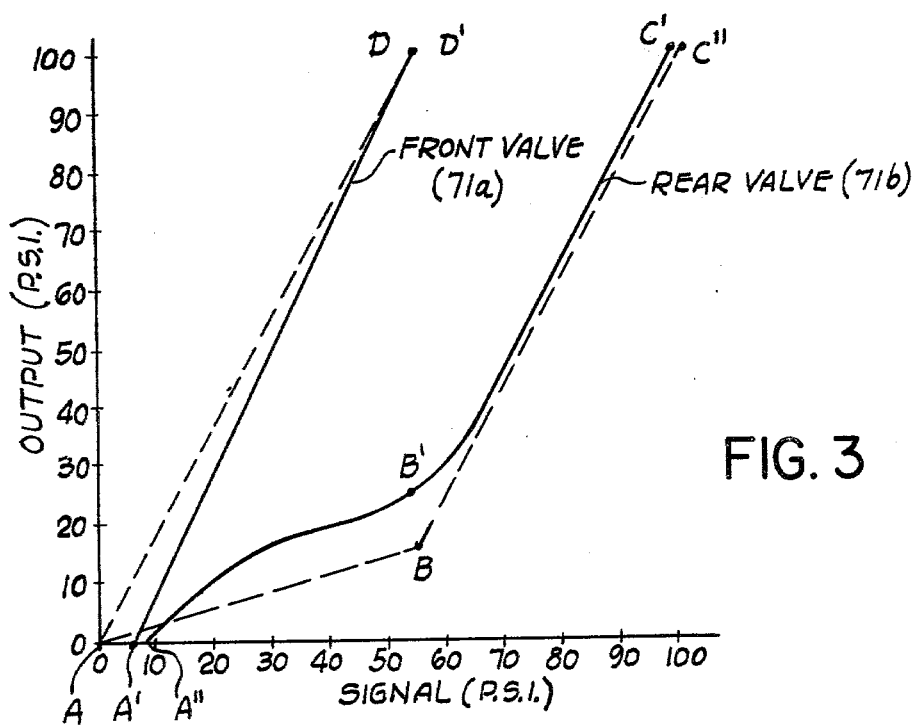
FIG. 3 graphically illustrates the theoretical and actual relationship between signal pressure and output pressure for the front and rear dual mode relay valve shown in FIG. 2, when the vehicle is operated bobtail.

For purposes of explanation, an amplifying ratio of 1.85 is assumed, which, in fact, has been found satisfactory for a tractor brake system. Attention is directed to FIGS. 3 and 4, which graphically illustrate the relationships between signal and output pressure for the front and rear dual mode relay valves 71a, 71b under two different vehicle operating conditions. The broken lines represent the theoretical relationship between signal and output pressures that would be obtained in the absence of system hysteresis. The solid lines represent the actual measured relationship.

Referring to FIG. 3, when the tractor is operated bobtail, the output of the rear dual mode relay valve 71b is proportionately reduced by the output pressure of the front dual mode relay valve 71a, which is fed back through the feedback conduit 31a, to the proportioning chamber 236 in the rear valve 71b. This reduction in the output pressure of the rear valve 71b occurs for a range of signal pressures indicated by the broken line AB. Once the output of the front dual mode valve 71a, reaches source pressure, which is typically in the range of 100 to 120 PSI, increasing signal pressure will not produce an attendant increase in the output pressure of the front valve 71a and consequently, the proportioning chamber 236 in the rear valve 71b will not be further pressurized. As shown in FIG. 3, with an amplifying ratio of 1.85, the front dual mode relay valve 71a will reach source pressure (approximately 100 PSI) at a signal pressure of approximately 55 PSI. The output pressure of the rear valve 71b will be less than 20 PSI as indicated by the broken line BC. For signal pressures greater than 55 PSI the output pressure of the rear valve 71b will gradually increase until it too equals source pressure (at point C). Thus, increasing the signal pressure, although not increasing the output pressure of the front dual mode relay valve 71a, will gradually increase the output pressure of the rear dual mode relay valve 71b. More specifically, the application of signal pressure equal to source pressure, to the valve 71b will produce an output pressure at the rear valve equal to source pressure; full depression of the treadle will then produce maximum output pressure in both front and rear valves even in bobtail operating conditions. It must be remembered, that under normal braking conditions, the treadle valve is only partially depressed and the output of the rear valve 71b will be proportionately reduced by the output pressure of the front valve and thus maximum vehicle control under normal braking conditions is achieved.

A secondary feature is also provided by the present brake system configuration. When operating bobtail, the operator can modulate or vary the brake application on the rear tractor brakes while maintaining full braking on the front brakes. Referring again to FIG. 3, it can be seen that once a signal pressure of 55 PSI is applied, maximum braking on the front tractor brakes is obtained because source pressure is being applied. A pressure substantially less than source pressure is applied to the rear tractor brakes at a signal pressure of 55 and as represented by the broken line BC, the rear brake application can be varied for a signal pressure range from 55 to 100 PSI, without affecting the output pressure of the front valve 71a.

Referring to FIG. 4, when the tractor is operated with a trailer, both valves 71a, 71b theoretically produce equal outputs for equal signal pressures, as represented by the broken line EF. This occurs because both valves 71a, 71b receive substantially equal signal pressures and equal feedback pressures.

The brake system explanation has thus far excluded the effects of valve hysteresis on brake system performance. In the preferred embodiment, the brake system hysteresis and pressure feedback between the dual mode relay valve 71a, 71b combine advantageously to produce other desirable brake system features. In the preferred embodiment, the seals 260, 262 and the control piston return spring 247, cause the hysteresis in the dual mode relay valves 71a, 71b to be larger than conventional trailer relay valves. Consequently, a larger signal pressure value, commonly called "crack-open pressure", is necessary to initially open the dual mode valves. The larger crack-open pressures of the dual mode relay valves will insure that the trailer brakes engage first due to the lower crack-open pressures of the trailer valves. This feature is desirable for it minimizes the risk of jackknifing and enhances overall vehicle handling.

When operating with a trailer, the valve hysteresis and pressure feedback advantageously cooperate to insure that the rear tractor brakes apply before the front tractor brakes. As explained earlier, when a trailer is attached to the tractor, trailer service brake pressure is communicated to the front dual mode relay valve 71a, during braking, by the pressure feedback conduit 133a. Depression of the treadle valve 99 initiates an immediate flow of signal pressure to both dual mode valves 71a, 71b and the trailer service conduit 133. Consequently, the proportioning chamber 236 of the front valve 71a, will be immediately pressurized by the trailer service brake pressure in the conduit 133a and the crack-open pressure of the front dual mode valve 71a will be effectively increased.

The rear dual mode relay valve 71b communicates with the output of the front valve 71a and thus, its proportioning chamber will not be pressurized until an output pressure is established by the front dual mode relay valve. This initial lack or delay in proportioning pressure to the rear valve 71b effectively reduces the crack-open pressure of the rear valve and thus, a smaller signal pressure will effect initial opening. Under these circumstances, the rear valve 71b will open before the front valve, so that the rear tractor brakes engage before the front brakes. This braking sequence is desirable for it provides better vehicle control especially under light braking applications.

Referring to FIG. 4, the relationship between output pressure and signal pressure for the dual mode valves 71a, 71b with a trailer attached is graphically illustrated by the solid graph lines E'F' and E''F'', respectively. As indicated, the rear valve 71b opens at a signal pressure (E'') less that that required to open the front valve 71a (E'). Although initial opening of both valves is delayed, once it occurs, the output pressure quickly rises to the theoretical output pressure which would be obtained in the absence of system hysteresis, as indicated by the broken line EF. Thus, although system hysteresis delays initial opening of the dual mode valve 71a, 71b it does not detrimentally effect system performance. In fact, once the valves have opened, the hysteresis and differences in crack-open pressure between the front and rear valves 71a, 71b are negligible.

When operating bobtail, the valve hysteresis and pressure feedback advantageously cooperate to cause the front dual mode valve 71a to open before the rear valve 71b. Additionally, the output pressure of the rear valve 71b is kept below the pressure that would normally produce lock-up in the rear brakes, for a range of signal pressures. As explained earlier, the front dual mode relay valve operates as an amplifying relay valve when the tractor is operated bobtail, due to the lack of feedback pressure in the proportioning chamber of the front valve 71a. This lack of feedback pressure reduces the crack-open pressure of the front valve when operating bobtail. The rear valve 71b continues to receive feedback pressure from the front valve even when operating bobtail and thus, its crack-open pressure will remain the same. The reduction of crack-open pressure in the front valve 71a causes its initial opening to lead the opening of the rear valve. Referring to FIG. 3, the output pressures of the front and rear valves 71a, 71b for a range of signal pressures is indicated by the solid lines, A′D′, A″B′C′, respectively. As shown, the opening of the front valve 71a (at A′) occurs slightly ahead of the opening of the rear valve 71b (at A″) and the output pressure of the front valve proportionately increases with increasing signal pressure (line A′D′). The rate of increase is determined by the amplifying ratio. The output of the rear valve 71b is not only delayed but more importantly increases very slowly for signal pressures up to approximately 55 PSI (line A″B).

It has been found that normal brake applications occur at signal pressures less than 55 PSI and that when operating bobtail, the likelihood of rear wheel lock-up increases substantially when relay valve output pressures exceed 25 PSI. It should be apparent from the graph in FIG. 3 that the performance characteristics of the disclosed brake system will provide ideal brake balance under normal brake applications. Maximum braking will be obtained once the signal pressure exceeds approximately 55 PSI, the output pressure of the rear dual mode valve 71b will increase proportionally with increased treadle depression so that signal pressure equal to source pressure, applied to the rear valve 71b, will produce an output equal to source pressure.

The solid lines of FIG. 3 which graphically exhibit the brake system performance do vary from the ideal relationship represented by the broken lines. The variation between ideal and actual is due to the system hysteresis and the delay in feedback pressure between the front and rear dual mode relay valves 71a, 71b.

Figure 5:
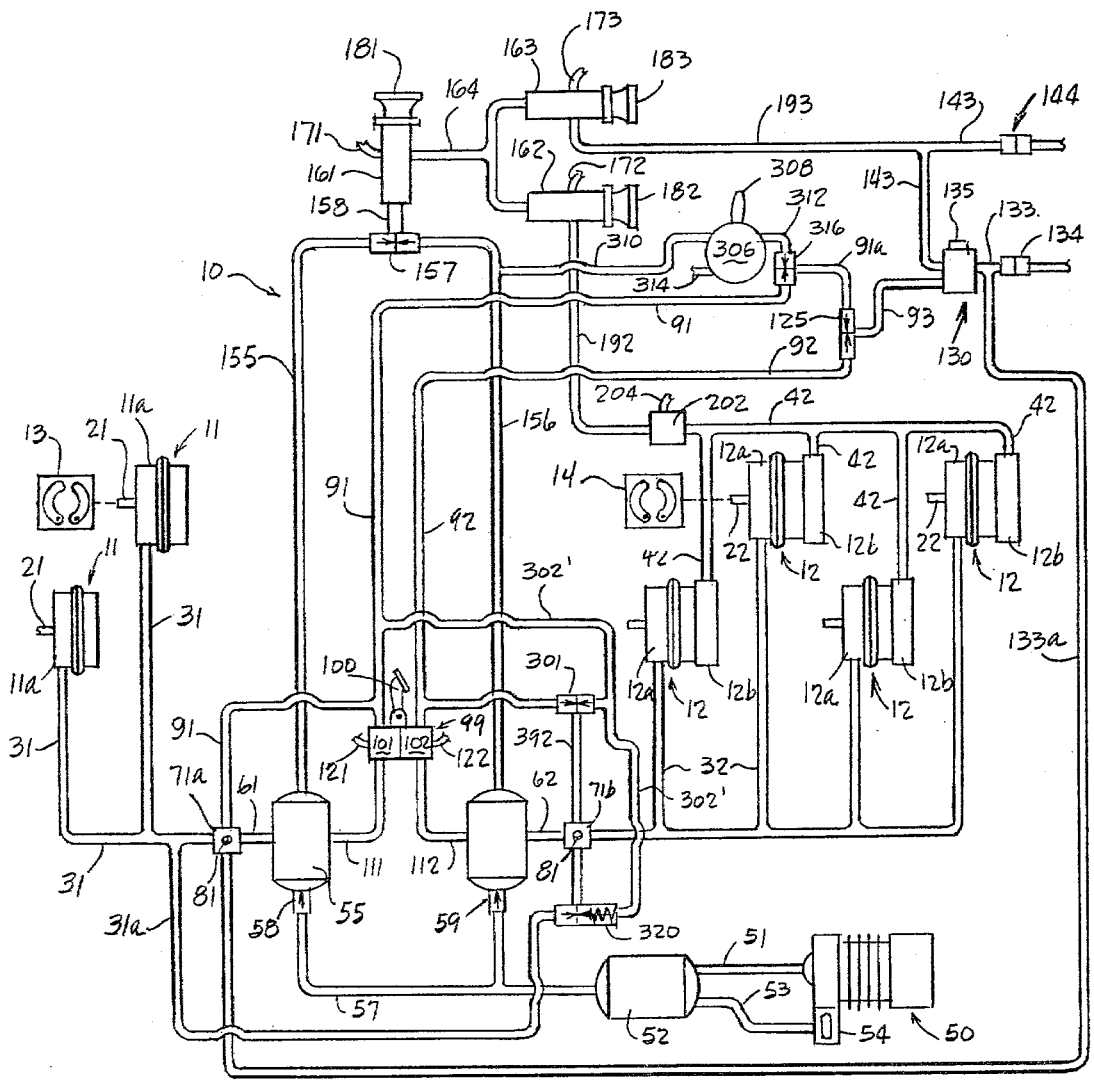
FIG. 5 is a schematic view of an alternate tractor brake system embodying the present invention.

FIG. 5 illustrates an alternate brake system which includes additional fail safe features and an operator actuated hand control valve for manually increasing the brake pressure applied to the trailer brake system. The system includes a hand control valve 306 operated by a lever 308. A supply conduit 310 communicates the reservoir pressure in the supply conduit 156 to the valve 306. The operator controlled valve 306 is operative to control the flow of pressurized fluid from the conduit 310 to a supply conduit 312. When the valve 306 is in its closed position, the flow of pressurized fluid between the conduit 310 and the conduit 312 is interrupted and a vent 314 exhausts any pressure in the conduit 312. Both the conduit 312 and the signal conduit 91 communicate with a signal conduit 91a through a double check valve. The check valve 316 is operative to permit the higher pressurized one of the conduits 312, 91 to communicate with the conduit 91a.

In operation, opening the valve 306 allows pressurized fluid to flow from the supply conduit 156, through the check valve 316 to the conduit 91a, if the pressure in the conduit 312 exceeds the pressure in the conduit 91. The pressure communicated to 91a will then travel through the check valve 125 to the signal conduit 93 (again provided that the pressure in the conduit 91a is greater than the pressure in the signal conduit 92). The pressure in the signal conduit 93 conveyed to the tractor protection valve 135 produces a proportionate pressure output in the trailer service brake conduit 133.

This alternate embodiment further includes a branch feedback conduit 302′ which communicates the pressure in the signal conduit 91 with the signal conduit 392 through a double check valve 301. Like the conduit 302 in FIG. 1, the conduit 302′ prevents the output of the rear dual mode valve 71b from being overreduced if the pressure in the reservoir 56 falls below the pressure in the reservoir 55. As explained earlier, a loss of pressure in the reservoir 56 will result in an abnormally low signal pressure for a given treadle depression. The output of the front valve 71a, conveyed to the proportioning chamber in the valve 71b, by the conduit 31a could potentially over-reduce the output of the valve 71b. The feedback conduit 302′ and double check valve 301 prevents this occurrence for if the pressure in the signal conduit 92 is abnormally low, the signal pressure in the conduit 91 will be conveyed to the signal conduit 392 through the check valve 301.

The feedback conduit 302′ also communicates with the proportioning pressure port 220 (shown in FIG. 2) of the valve 71b through a biased check valve 320. The front feedback conduit 31a also communicates with the signal port through the check valve 320. The check valve 320 is biased to allow unrestricted communication between the feedback conduit 31a and the proportioning pressure port 220 of the valve 71b until the pressure in the conduit 302′ exceeds the pressure in the conduit 31a by a predetermined amount. The pressure difference which must exist before the check valve 320 will operate to communicate the conduit 302′ with the proportioning pressure port 220 is dependent on the biasing force in the check valve.

The communication established between the conduits 302′, 31a and the check valve 320 fills a variety of functions. First, it prevents the operation of the hand valve 306 and attendant increase in trailer brake application, from overly affecting the braking on the tractor. As explained above, operation of the hand control 306 increases the pressure in the trailer service line 133. This increased pressure, transmitted through the feedback conduit 133a, will reduce the output pressure of the front dual mode relay valve 71a. The decreased output of the front valve will then increase the output of the rear dual mode valve 71b because the pressure in the proportioning chamber will be reduced. The bias check valve 320 and the conduit 302′ prevent an excessive increase in the output of valve 71b by communicating the higher pressure in the conduit 302′ to proportioning pressure port 220 of the valve 71b, once the feedback pressure in conduit 31a falls below the pressure in the conduit 91 by a predetermined amount.

A second function of the conduit 302′ and the check valve 320 is to prevent the rear dual mode valve 71b from over amplifying its output should a failure occur in the front brake system supply. If the pressure in reservoir 55 falls substantially below the pressure in the reservoir 59, the feedback pressure in the conduit 31a will be substantially reduced resulting in an increased output of the rear dual mode valve 71b. To prevent an excessive increase, the bias check valve 320 will operate to communicate the pressure in the conduit 302′ with the proportioning pressure port 220 in the valve 71b if the pressure in the conduit 31a falls below the pressure in the conduit 302′ by a predetermined amount.

As disclosed in the preferred embodiment, the dual mode relay valves 71a, 71b are identical. The size and internal construction of these valves determines the relative delivery pressure outputs. Employing identical relay valves, results in equal delivery pressure output of both when the tractor is operated with a trailer and unequal output with the tractor is operated bobtail. Specifically, under bobtail operating conditions, the output of the front relay valve is proportionately greater than the rear relay valve. It should be obvious to one skilled in the art, that by modifying chamber sizes and/or control piston areas, the relationship between the front and rear relay valve output pressures can be altered to suit a particular application. For example, the front and rear relay valves can be sized and configured such that when operating with a trailer, the delivery pressure output of the rear relay valve will be greater than that of the front relay valve and when operating bobtail, the delivery pressure output of the front relay valve will be greater than that of the rear relay valve.

It should also be apparent to one skilled in the art, that the pressure feedback methods disclosed, can be used solely to overcome or control valve hysteresis that is prevalent in conventional brake systems. In other words, if one is not interested in modifying the relative output pressures of the front and rear relay valves in response to vehicle operating conditions, one can construct a brake system in which the feedback pressure does not change in response to vehicle operating mode. Accordingly, in this type of system, the relative output pressures of the relay valves would remain fixed, but valve hysteresis would be remedied.

Although the vehicle brake system of this invention has been described with a certain degree of particularity, various changes and modifications can be made to it by those skilled in the art without departing from the spirit and the scope of the invention as described and hereinafter claimed.

What is claimed:

1. A brake system for the tractor unit of tractor-trailer vehicle adapted to be connected to a trailer carried brake system, the system comprising:
   (a) a source of pneumatic pressure;
   (b) friction brakes mounted on each wheel of the tractor unit, each of said brakes being energized by an associated pneumatically operated brake actuator;
   (c) an operator controlled treadle valve adapted for generating a signal pressure in proportion to the amount of treadle valve depression;
   (d) two dual mode relay valves for controlling the flow of pneumatic pressure, one for the front brake actuators, the other for the rear brake actuators, each dual mode relay valve including:
      (i) non-communicating signal pressure, proportioning pressure, and delivery pressure chambers;
      (ii) a flow passage for conveying pneumatic pressure from a reservoir port communicating with said source of pneumatic pressure to the delivery pressure chamber;
      (iii) an inlet/exhaust valve interposed in said flow passage adapted to interrupt the pressure flow therethrough when said valve is seated and concurrently exhaust pressure from the delivery pressure chamber;
      (iv) a biasing spring tending to seat said inlet/exhaust valve;
      (v) an annular control piston with respective surface portions communicating with said non-communicating signal pressure, proportioning pressure, and delivery pressure chambers, the movement of said control piston being in response to the combination of the pressures in said chambers acting upon the respective surface portions of said control piston, the control piston further including a projecting portion, which upon movement of the control piston, abuttably engages and unseats said inlet/exhaust valve;
   (e) conduits communicating the treadle valve with the signal pressure chamber in each dual mode relay valve;
   (f) conduits communicating the delivery chambers of the front and rear dual mode relay valves with the front and rear brake actuators respectively;
   (g) a trailer brake system conduit for conveying pneumatic pressure from the tractor brake system to a trailer brake system, said conduit being generally at atmospheric pressure when not connected to a trailer brake system and said conduit being at a pressure proportional to the amount of treadle valve depression when said conduit is connected to a trailer carried brake system;
   (h) a conduit communicating the delivery chamber of the front dual mode relay valve with the proportioning chamber of the rear dual mode relay valve; and
   (i) a conduit communicating the trailer brake system conduit with the proportioning pressure chamber of the front relay valve.

2. In a tractor-trailer vehicle of a type in which the application of the trailer brakes is controlled by fluid pressure supplied by the tractor unit, a tractor brake system comprising:
   (a) a source of pressurized fluid;
   (b) friction brake means on at least one front and one rear wheel, each brake means energized by a fluid pressure operated brake actuator;
   (c) a front valve means and a rear valve means for controlling the flow of pressurized fluid to the front and rear brake actuators respectively, the output pressure of said front and rear valve means being responsive in part to an operator applied force;
   (d) means communicating the input of said rear valve means with the output of the front valve means such that the output pressure of said rear valve means is modified by the output pressure of said front valve means;
   (e) a connectible conduit means for conveying operator controlled fluid pressure to a trailer brake system, said conduit means being generally at atmospheric pressure when not connected; and,
   (f) means communicating the input of the front valve means with said conduit means such that the output pressure of the front valve means is modified by the pressure in the conduit means.

3. The brake system of claim 2 wherein the operator applied force is a signal pressure generated by an operator controlled treadle valve.

4. A brake system for the towing unit of an articulated vehicle, said brake system comprising:
   (a) a source of pressurized fluid;
   (b) fluid pressure operated friction brake means on at least one front and one rear wheel;
   (c) conduit means for conveying fluid pressure to the brake system of a towed unit, said conduit means being generally at atmospheric pressure when not connected to the towed unit;
   (d) a brake proportioning means including front and rear valve means for controlling the flow of fluid pressure to the front and rear brake means respectively, the fluid pressure output of one of the valve means being a function of the combination of an operator applied force and the output pressure of the other valve means, and, the output pressure of the other valve means being a function of the combination of operator applied force and the pressure in the conduit means.

5. The brake system of claim 4 wherein the operator applied force is a signal pressure generated by an operator controlled treadle valve.

6. A brake system for the towing unit of an articulated vehicle, the brake system comprising:
   (a) a source of pressurized fluid;
   (b) fluid pressure operated brake actuators for engaging friction brakes on at least one front and one rear wheel;
   (c) conduit means for conveying fluid pressure to a brake system of a towed unit;
   (d) brake proportioning means, responsive to pressure in said conduit means;
   (e) said proportioning means including front and rear valve means for controlling the flow of pressurized fluid to the front and rear brake actuators, respectively; and,
   (f) pressure feedback means between the front and rear relay valve for modifying the output pressure of said rear valve means until a predetermined output pressure is reached wherein said feedback means has a diminishing affect on said output of said rear valve means.

7. A dual mode relay valve for controlling the flow of pressurized fluid to a fluid pressure operated brake actuator, comprising:
   (a) a housing;
   (b) flow passage means for conveying fluid from a reservoir port to a delivery port;
   (c) an inlet valve member interposed in said flow passage means and operative to interrupt fluid flow therethrough when said valve is seated;
   (d) a biasing means tending to seat said valve member;
   (e) non-communicating signal pressure, proportioning pressure, and delivery pressure chambers, said delivery pressure chamber communicating with said delivery port;
   (g) a control piston means with respective surface portions communicating with said non-communicating signal pressure, proportioning pressure, and delivery pressure chambers, the movement of said control piston means being in response to the combination of the pressures in said chambers acting upon the respective surface portions of said control piston means, the control piston means further including an abutment means for unseating the inlet valve member; and,
   (g) exhaust valve means for exhausting the fluid pressure in the delivery pressure chamber when said control piston means is not abutting the inlet valve member.

8. A dual mode relay valve for using a fluid pressure operated brake proportioning system, comprising:
   (a) a valve means for controlling the flow of pressurized fluid from a reservoir port to a delivery port;
   (b) a housing with a control piston slidably received therein, the movement of said control piston being in response to the combination of an operator controlled signal pressure, a proportioning pressure, and the pressure at the delivery port, the control piston further including an abutment means for unseating said valve means to allow fluid flow between said reservoir and delivery ports upon movement of said control piston, said abutment means spaced from said valve means when said operator controlled signal pressure is below a predetermined level.

9. A brake proportioning system for the tractor unit of a tractor-trailer type vehicle comprising:
   (a) a source of pressurized fluid;
   (b) fluid pressure operated brake actuators on the front and rear wheels of said tractor;
   (c) front and rear valve means for controlling the flow of pressurized fluid to the front and rear brake actuators respectively; and
   (d) feedback means communicating with the front valve means for reducing the output pressure of the front valve means to effect increased braking on the rear wheels of the tractor unit when operating with a trailer.

10. In a tractor-trailer vehicle of a type in which the application of the trailer brakes is controlled by fluid pressure supplied by the tractor unit, a tractor brake system comprising:
    (a) a source of pressurized fluid;
    (b) friction brake means on at least one front and one rear wheel, each brake means energized by a fluid pressure operated brake actuator;
    (c) a front valve means and rear valve means for controlling the flow of pressurized fluid to the front and rear brake actuators respectively, the output pressure of said front and rear valve means being responsive in part to an operator applied force;
    (d) means communicating the input of said rear valve means with the output of the front valve means such that the output pressure of said rear valve means is reduced by the output pressure of said front valve means;
    (e) a connectible conduit means for conveying operator controlled fluid pressure to a trailer brake system, said conduit means being generally at atmospheric pressure when not connected; and,
    (f) means communicating the input of the front valve means with said conduit means such that the output pressure of the front valve means is reduced by the pressure in the conduit means.

11. The brake system of claim 10 wherein the operator applied force is a signal pressure generated by an operator controlled treadle valve.

12. A brake system for the tractor unit of tractor-trailer type vehicle comprising:
    (a) a source of pressurized fluid;
    (b) frictional brake means on the front and rear wheels, said brake means applied by fluid pressure operated brake actuators;
    (c) a front valve means and a rear valve means for controlling the flow of pressurized fluid to the front and rear actuators respectively; and
    (d) front and rear pressure feedback means communicating with the front and rear valve means, responsive to the presence or absence of a trailer unit attached to said tractor unit, said pressure feedback means operative to effect a reduced braking on the rear wheels of the tractor unit when operating without a trailer.

13. A brake system for a tractor unit of a tractor-trailer vehicle, comprising:
    (a) a source of pressurized fluid;
    (b) fluid pressure operated brake actuators for engaging front and rear wheel mounted brakes;
    (c) front and rear valve means, responsive to movement in an operator controlled treadle, for controlling the flow of pressurized fluid from the source to the front and rear brake actuators respectively;

(d) pressure feedback means communicating with said rear valve means, responsive to the absence of an attached trailer, for reducing the flow of pressurized fluid to the rear actuators for a range of treadle depression; and (e) said feedback means having a diminishing affect on the flow of pressurized fluid to the rear brake actuators once said range of treadle depression is exceeded.

14. The brake system of claim 13 further including a feedback means communicating with said front valve means for increasing the crack-open pressure of said front valve means so that the rear valve means opens before the front valve means.

15. A brake proportioning system for a tractor unit of a tractor-trailer vehicle which proportions the brake application fluid pressure between front and rear vehicle braking means depending on the vehicle operational mode, the system comprising:

(a) a source of pressurized fluid;

(b) friction brake means operatively connected to each vehicle wheel and energized by fluid pressure operated brake actuators;

(c) a front relay valve and a rear relay valve for controlling the flow of pressurized fluid to the front and rear brake actuators respectively, the output pressure of said front and rear relay valves being responsive in part to a signal pressure generated by an operator controlled treadle valve;

(d) means communicating the input of said rear relay valve with the output of the front relay valve such that the output pressure of said rear relay valve is reduced by the output pressure of said front relay valve until the output pressure of the front relay valve equals the source pressure; and, (e) a connectable conduit means for conveying the operator controlled signal pressure to a trailer brake system, said conduit means being generally at atmospheric pressure when not connected.

16. The brake proportioning system defined by claim 15 further including means communicating the input of the front relay valve with the conduit means such that the output pressure of the front relay valve is reduced by the pressure in the conduit means.

17. A brake system for the tractor unit of a tractor-trailer vehicle having means for connecting to a trailer carried brake system, when a trailer is attached to the tractor, comprising:

(a) a source of pneumatic pressure;

(b) front and rear friction brakes mounted on front and rear wheels of the tractor unit, each of said brakes being energized by an associated pneumatically operated brake actuator;

(c) an operator controlled treadle valve for generating a signal pressure in proportion to the amount of treadle depression;

(d) two relay valves for controlling the flow of pneumatic pressure to associated output ports, each relay valve including:

(i) a signal pressure chamber for receiving signal pressure from the treadle valve;

(ii) a proportioning chamber which when pressurized produces a force which renders a force produced by the signal pressure in the signal pressure chamber partially ineffective;

(e) conduits communicating the treadle valve with the signal pressure chamber in each relay valve;

(f) conduits communicating the output ports of the front and rear relay valves with the front and rear brake actuators respectively; and, (g) a conduit communicating the output port of the front relay valve with the proportioning chamber of the rear relay valve.

18. The brake system of claim 17 further comprising:

(a) a trailer brake system conduit for conveying pneumatic pressure from the tractor brake system to a trailer brake system, the conduit being generally at atmospheric pressure when not connected to a trailer brake system and being at a pressure proportional to the amount of treadle depression when the conduit is connected to a trailer carrier brake system; and, (b) a conduit communicating the trailer brake system conduit with the proportioning pressure chamber of the front relay valve.

19. A brake system for the towing unit of articulated vehicle, said brake system comprising:

(a) a source of pressurized fluid;

(b) fluid pressure operated friction brake means on at least one front and one rear wheel;

(c) conduit means for conveying fluid pressure to the brake system of a towed unit;

(d) a brake proportioning means including front and a rear relay valves for controlling the flow of pressurized fluid to the front and rear brake means, respectively; and, (e) pressure feedback means between the front and rear relay valve and between the conduit means and the front relay valve for modifying the output pressures of said valves to effectively change the relative braking rate between the front and rear wheels of the towing unit when the towing unit is operated without the towed unit.

20. The brake system of claim 19 wherein said pressure feedback means reduces the output pressure of the rear valve means until the output pressure of the front valve means is substantially equal to the source pressure, when the towing unit is operated without the towed unit.

21. In a vehicle having towed and towing units in which the towing unit has front and rear road wheels and the towed unit has road wheels, the improved braking apparatus comprising:

(a) fluid pressure actuated brake assemblies, first and second of the assemblies being postioned selectively to arrest rotation of one of the front wheels and one of the rear wheels respectively, and at least one assembly being positioned selectively to arrest rotation of a towed unit road wheel;

(b) a source of fluid under pressure;

(c) a fluid supply system for selectively delivering fluid under pressure from the source to the brake assemblies in response to an operator supplied signal;

(d) said system including first and second valve means for controlling pressure delivery to the first and second brake assemblies, respectively;

(e) means for increasing valve hysteresis in said first and second valve means to effect an increase in the crack-open pressure of said first and second valve means such that a line delivering brake pressure to the towed vehicle brake assembly commences to receive fluid under pressure prior to lines connected to the towing vehicle brake assemblies in response to an operator supplied brake application signal.

22. In a highway tractor adapted for towing a trailer and having at least one front and one rear brake actuator, the improved brake control system comprising:
 (a) a source of air under pressure;
 (b) a valve and conduit system connecting the source to the actuators;
 (c) the valve and conduit system including trailer means to sense the absence of a trailer;
 (d) an operator controlled treadle having a normal braking range and an override braking range; and,
 (e) valve means responsive to operator initiated treadle signals and to the trailer sensing means to provide a first ratio of pressures to the front and rear actuators during the normal range wherein the pressure supplied to the front actuator exceeds that supplied to the rear actuator and a different ratio when the treadle is in the override range wherein the pressure supplied to the rear actuator more closely equals the pressure supplied to the front actuator than when the treadle is in the normal range.

23. In a vehicle brake system having a source of pressurized fluid and fluid pressure operated friction brake means on at least one front and one rear wheel, a brake proportioning means comprising:
 (a) a front valve means and a rear valve means for controlling the flow of pressurized fluid to the front and rear brake means respectively;
 (b) at least one of said valve means having a valve operating means including a surface defining at least one effective pressure area;
 (c) means communicating the output of the other valve means with the effective pressure area on said valve operating means such that the output pressure applied to said effective pressure area generates a force that opposes an operator applied force on said valve operating means, so that the output pressure of the one valve means will be a function of a combination of the operator applied force and the output pressure of the other valve means.

24. The improved braking apparatus of claim 21 further comprising pressure feedback means for delaying the initial opening of said first valve means such that fluid under pressure is delivered to a pressure supply line connected to the rear wheel brake assembly after the towed vehicle line has commenced to receive pressure and prior to a time when a line connected to the front brake assembly commences to receive pressure.

25. The improved braking apparatus of claim 21 wherein said means for increasing valve hysteresis comprises a seal means.

26. A brake system for the towing unit of an articulated vehicle, comprising:
 (a) a source of pressurized fluid;
 (b) fluid pressure operated friction brake means on at least one front and one rear wheel;
 (c) conduit means for conveying fluid pressure to the brake system of a towed unit, said conduit means being generally at atmospheric pressure when not connected to a towed unit and being at a pressure proportional to an operator controlled braking force when said conduit is connected to a towed unit;
 (d) front and rear valve means for controlling the flow of fluid pressure to the front and rear brake means respectively, as a function of the operator controlled braking force;
 (e) pressure feedback means between said front valve means and said conduit means for delaying the initial opening of said front valve means when the towing unit is connected to a towed unit such that the rear valve means opens before said front valve means in response to the operator controlled brake force;
 (f) pressure feedback means between the front and rear valve means operative when the towing unit is not connected to a towed unit to delay the initial opening of said rear valve means so that the front valve means opens before said rear valve means in response to an operator controlled braking force.

27. The brake system of claim 25 wherein said front and rear valve means include seal means for increasing the crack-open pressures of said front and rear valve means such that said conduit means commences to receive pressure in response to the operator controlled braking force prior to opening of the front and rear valve means.

28. A braking system for a tractor unit of a tractor-trailer type vehicle, comprising:
 (a) a source of pneumatic pressure;
 (b) pneumatically operated friction brake means on at least one front and one rear wheel;
 (c) conduit means for conveying pressure to the brake system of the trailer unit, said conduit means being generally at atmospheric pressure when not connected to the trailer and being at a brake pressure that is a function of an operator controlled braking signal when connected to the trailer; p1 (d) front and rear valve means for controlling the flow of fluid pressure to the front and rear brake means respectively;
 (e) means for increasing the crack open pressures of said front and rear valve means such that said conduit means commences to receive pressure in response to the operator controlled braking prior to the opening of said front and rear valve means;
 (f) first pressure feedback means operative when said conduit means is connected to a trailer unit for further increasing the crack open pressure of said front valve means; and,
 (g) second pressure feedback means for further increasing the crack open pressure of said rear valve means causing said front valve means to open prior to said second valve means, in response to the operator applied braking force, when the tractor unit is not connected to a trailer unit.

* * * * *